(12) United States Patent
Ameil et al.

(10) Patent No.: US 9,267,855 B2
(45) Date of Patent: Feb. 23, 2016

(54) METHOD FOR DETERMINING THE TORQUE AND/OR ANGULAR SPEED OF A ROTATING SHAFT AND A DEVICE FOR CARRYING OUT SAME

(75) Inventors: Jean-Michel Ameil, Rubelles (FR); Thierry Brichler, Paris (FR)

(73) Assignee: SNECMA, Paris (FR)

( * ) Notice: Subject to any disclaimer, the term of this patent is extended or adjusted under 35 U.S.C. 154(b) by 602 days.

(21) Appl. No.: 13/698,741

(22) PCT Filed: May 19, 2011

(86) PCT No.: PCT/FR2011/051141
§ 371 (c)(1),
(2), (4) Date: Nov. 19, 2012

(87) PCT Pub. No.: WO2011/144874
PCT Pub. Date: Nov. 24, 2011

(65) Prior Publication Data
US 2013/0060490 A1 Mar. 7, 2013

(30) Foreign Application Priority Data
May 21, 2010 (FR) ...................... 10 53973

(51) Int. Cl.
*G01L 3/10* (2006.01)
*G01P 3/488* (2006.01)
*G01P 3/489* (2006.01)

(52) U.S. Cl.
CPC ................. *G01L 3/109* (2013.01); *G01P 3/488* (2013.01); *G01P 3/489* (2013.01)

(58) Field of Classification Search
CPC .......... G01L 3/109; G01P 3/488; G01P 3/489
See application file for complete search history.

(56) References Cited

U.S. PATENT DOCUMENTS

| 6,289,294 | B1* | 9/2001 | Rataj et al. ................... 702/145 |
| 6,460,422 | B1 | 10/2002 | Kuroda |
| 2011/0193552 | A1* | 8/2011 | Fulkerson et al. ....... 324/207.25 |

FOREIGN PATENT DOCUMENTS

| DE | 19817886 | 10/1999 |
| GB | 2133885 | 8/1984 |
| GB | 2383417 | 6/2003 |
| WO | WO 2004/067215 A2 | 8/2004 |
| WO | WO 2007055022 A1 * | 5/2007 |

OTHER PUBLICATIONS

International Search Report as issued for PCT/FR2011/051141.

\* cited by examiner

*Primary Examiner* — Alexander Satanovsky
*Assistant Examiner* — John Kuan
(74) *Attorney, Agent, or Firm* — Pillsbury Winthrop Shaw Pittman LLP

(57) ABSTRACT

A method allowing the reliable and accurate calculation of the torque of a shaft using two phonic wheels and a sensor, the method including correlating the signal resulting from a rotation or one sixth of a rotation with the signal resulting from the subsequent rotation or one sixth of a rotation. The length of time between two passages of teeth is calculated by interpolating the cross-correlation function using least squares interpolation.

8 Claims, 2 Drawing Sheets

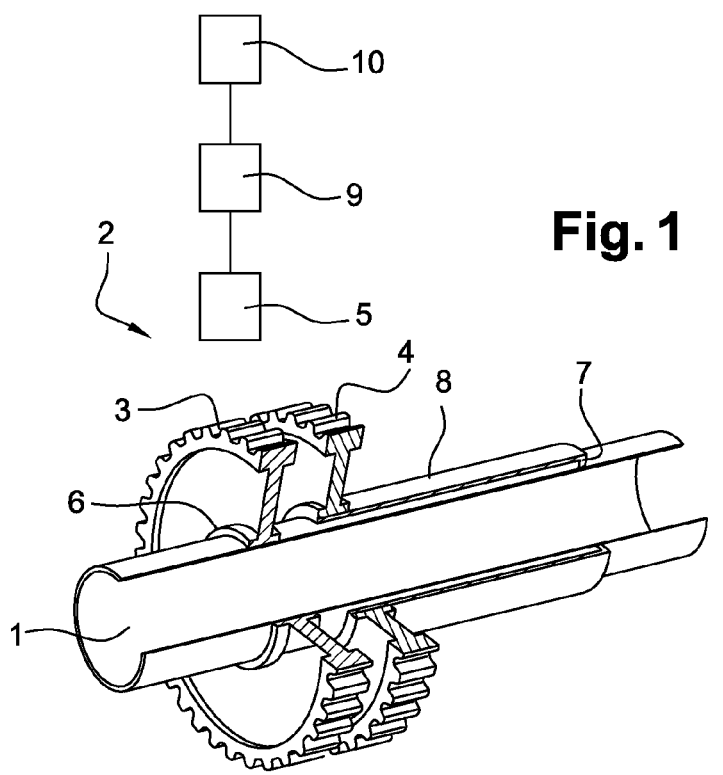
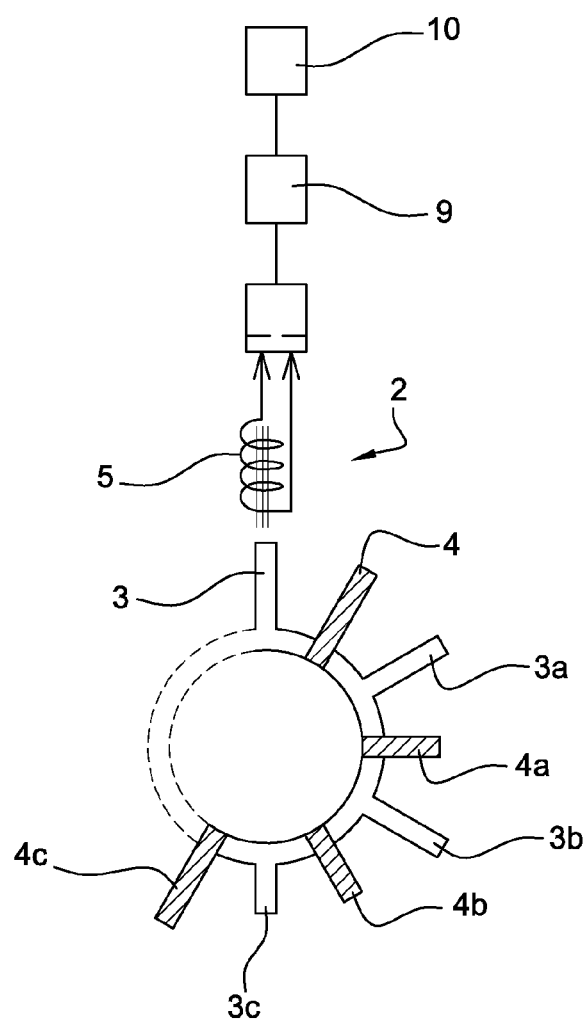

METHOD FOR DETERMINING THE TORQUE AND/OR ANGULAR SPEED OF A ROTATING SHAFT AND A DEVICE FOR CARRYING OUT SAME

CROSS REFERENCE TO RELATED APPLICATIONS

This application is the U.S. National Stage of PCT/FR2011/051141, filed May 19, 2011, which in turn claims priority to French Patent Application No. 1053973, filed May 21, 2010, the contents of all applications are incorporated herein by reference in their entireties.

TECHNICAL FIELD OF THE INVENTION

The present invention relates to a method for determining the torque and/or the angular speed of a rotating shaft, as well as a device for carrying out the method of determination according to the invention. The present invention also relates to the use of the method according to the invention to calculate the torque of the shaft or to calculate its angular speed. The present invention also relates to a shaft provided with a device according to the invention.

PRIOR ART

When a torque is applied to a transmission shaft, it undergoes a torsional deformation. For a known modulus of elasticity, and at constant temperature, the torsion angle is proportional to the transmitted torque.

The prior art recognises different methods for measuring torque using this principle. Such a method for measuring the torque of a shaft is described for example in document DE19817886.

Thus, one of the simplest ways of measuring a torque is to measure the phase shift between two phonic wheels each mounted at an end of a shaft. In this case, a variable-reluctance sensor records a signal representative of the angular position of each of the wheels. The angular offset between the two wheels allows the torque transmitted by the shaft to be obtained.

However, this measurement method is not very accurate, because it is very sensitive to flexion movements of the shaft, as well as to external disturbances (temperature, vibrations . . . ).

In order to limit the inaccuracies in the measurement of the torque, another method consists in bringing the two phonic wheels closer together in such a way as to limit the errors caused by the relative movements of the two phonic wheels with respect to the sensors. In this case, however, it is not possible simply to bring the two wheels closer together, because this would lead to a net reduction in the sensitivity of the system. The first phonic wheel is therefore brought closer to the second one by means of a reference sleeve that does not transmit torque, in such a way that the first phonic wheel is integral with a point distant from the point at which the second phonic wheel is connected. In this case, the two wheels generally comprise teeth which are intercalated and a single variable-reluctance sensor records a signal which produces a pulse every time a tooth passes in front of the sensor. The calculation of the torque is then generally derived from the detection of the passage through zero of the falling edge of the signal and the measurement of the time that passes between two successive falling edges of the signal.

This method certainly makes it possible to reduce the measurement inaccuracies due to the spacing of the wheels. However, it is found experimentally that the calculation of the torque is greatly affected by noise, because this method is very sensitive to external disturbances, to electromagnetic disturbances, as well as to noise.

The accuracy and the reliability of the measurement of the torque are of prime importance, because the torque is then used to calculate the power of the motor to which the shaft is connected.

DISCLOSURE OF THE INVENTION

The invention aims to overcome the drawbacks of the prior art by proposing a method for determining the torque of a shaft that is more accurate than those of the prior art.

Another aim of the invention is to propose a method for determining the torque of a shaft that experiences little sensitivity to noise and external disturbances.

Another aim of the invention is to propose a method for determining the torque of a shaft that is reliable.

Another aim of the invention is to propose a method for determining the angular speed of a rotating shaft that is accurate and barely affected by noise.

To do this, a first aspect of the invention relates to a method for determining the torque and/or the rotational speed of a rotating shaft, with the aid of:
  one or more wheels provided with teeth, each wheel being integral with a point of the shaft,
  a sensor capable of generating a pulse of an analog signal each time a tooth passes in front of it;
the method comprising the following steps:
  generation of a first and a second analog signal with the aid of the sensor, the second analog signal being offset in time with respect to the first analog signal, the second analog signal having a duration equal to the duration of the first analog signal;
  conversion of the first and the second analog signal into a first and a second digital signal;
  calculation of the temporal cross-correlation function of the first digital signal with the second digital, signal;
  calculation of the duration between two pulses of the first analog signal with the aid of the cross-correlation function.

The method according to the invention is particularly, remarkable in that the determination of parameters such as the torque of the shaft is no longer carried out on the basis of a single point of the signal, but is carried out on the basis of the whole signal. Contrary to the methods of the prior art, use is no longer made solely of the point of passage of the analog signal through zero, but rather use is made of the whole signal over a rotation or over a portion of a rotation. The whole of this signal is in fact correlated with the signal of the following rotation or of the portion of the following rotation and it is the cross-correlation function that permits the duration between two pulses to be calculated.

The method according to the invention also advantageously comprises the following step:
  calculation of the torque of the shaft with the aid of the duration between the two pulses; or
  calculation of the rotational speed of the shaft with the aid of the duration between the two pulses.

When the method according to the invention permits the torque of a shaft to be determined, the method according to the invention preferably uses two wheels, referred to in the following as the first wheel and the second wheel, the first wheel being integral with a first point of the shaft and the second wheel being integral with a second point of the shaft, the first point being distant from the second point such that the first wheel and the second wheel permit the torque of the shaft to be recorded.

The first and the second wheels are advantageously disposed in such a way that the teeth of the first wheel are alternated with the teeth of the second wheel.

The method according to the invention is very particularly advantageous for calculating the torque of the shaft. In the case where the shaft is provided with two wheels having alternating teeth, the step for calculating the duration between two pulses is preferably a step for calculating the duration between two successive pulses. The step for calculating the duration between two pulses thus corresponds to a step for calculating the duration between pulse n and pulse n+1. Physically, this step for calculating the duration between two successive pulses thus corresponds to the angular offset between the first tooth of the first wheel and the first tooth of the second wheel. The torque of the shaft is then calculated, because the affine function is known which links the torque and the angular offset between the first tooth of the first wheel and the first tooth of the second wheel.

The method according to the invention can also be used to calculate the rotational speed of the shaft more accurately, if necessary. In the case where the shaft is provided with two wheels having alternating teeth, the step for calculating the duration between two pulses is thus preferably a step for calculating the duration between two pulses which each correspond to the passage of two successive teeth of the same wheel. In this case, the step for calculating the duration between two pulses thus corresponds to a step for calculating the duration between pulse n and pulse n+2.

According to a preferred embodiment of the invention, the step for calculating the duration between two pulses comprises the following steps:
identification of the maxima of the cross-correlation function;
calculation of times t1 and t2 at which the cross-correlation function reaches these maxima;
calculation of the duration between these times t1 and t2.

When a signal is correlated temporally with the same signal offset in time, the maxima of the cross-correlation function coincide in time with the maxima of this signal. The fact of calculating instants t1 and t2, at which the maxima of the cross-correlation function occur, thus permits instants t1 and t2 to be found at which the pulses of the considered analog signal occur. And since each pulse corresponds to the passage of a tooth in front of the sensor, this permits the duration between two passages of teeth to be calculated.

This calculation of instants t1 and t2, at which the cross-correlation function is a maximum, permits the duration between two passages of teeth in front of the sensor to be calculated very accurately. Moreover, this calculation experiences very little sensitivity to external disturbances and noise, by reason of the integrations carried out by the cross-correlation.

According to a very preferred embodiment, the step for calculating the maxima of the cross-correlation function is carried out by interpolation of the cross-correlation function. This method of calculation is very accurate.

According to a very preferred embodiment, the interpolation of the cross-correlation function is carried out by a parabolic interpolation method of least squares.

According to a particularly preferred embodiment, the interpolation of the cross-correlation function is carried out only over time intervals in which times t1 and t2 are expected.

During the rotation of the shaft, the spacing of the teeth and therefore the duration between the passage of two selected teeth are obtained approximately. Consequently, there is no need to interpolate the cross-correlation function in its entirety, because that would be onerous in terms of calculations and complicated for the computer that would perform this interpolation. It is thus sufficient to interpolate the cross-correlation function only around points which it is sought to determine precisely.

According to different embodiments:
the first analog signal and the second analog signal each have a duration equal to the duration of a complete rotation of the shaft, or
the first analog signal and the second analog signal each have a duration equal to the duration of one sixth of a rotation of the shaft,
the first analog signal and the second analog signal each correspond to the signal generated by the sensor during two consecutive rotations of the shaft;
the first analog signal and the second analog signal each correspond to the signal generated by the sensor during two portions of a rotation of the shaft which are consecutive, these portions of a rotation of the shaft preferably being equal to one sixth of a rotation of the shaft when the wheels comprise six equidistant teeth.

The invention also relates to the use of the method according to any one of the preceding claims for calculating the torque of a shaft.

In this case, the method according to the invention preferably uses the following elements:
a first and a second wheel, the first wheel being integral with a first point of the shaft, the second wheel being integral with a second point of the shaft, the second point of the shaft being distant from the first point of the shaft, the first and the second wheels each being provided with teeth, the teeth of the first wheel being disposed alternately with respect to the teeth of the second wheel;
a sensor capable of transforming the passage of each of the teeth of the first and the second wheels into pulses of an analog signal;
and the method then preferably comprises the following steps:
generation of a first analog signal producing pulses generated by the passage of the teeth in front of the sensor during a rotation or a portion of a rotation of the shaft;
digitalisation of the first analog signal into a first digital signal;
generation of a second analog signal producing pulses generated by the passage of the teeth in front of the sensor during the following rotation or the portion of the following rotation of the shaft;
digitalisation of the second analog signal into a second digital signal;
calculation of the cross-correlation function of the first digital signal with the second digital signal;
calculation of the duration between two successive pulses of the first analog signal with the aid of the cross-correlation function;
calculation of the torque of the shaft on the basis of the duration between two successive pulses of the first analog signal.

The invention also relates to the use of the method according to any one of the preceding claims for calculating the rotational speed of a shaft.

According to another aspect, the invention also relates to a device for implementing a method according to the invention, the device comprising:
one or more wheels provided with teeth, each wheel being integral with a point of the shaft, a sensor capable of transforming the passage of each tooth in front of it into a pulse of an analog signal;

an analog-to-digital converter capable of transforming the analog signal from the sensor into a digital signal;

a computer capable of:

calculating the cross-correlation function of two digital signals from the converter;

calculating the duration between two successive pulses of the analog signal on the basis of the cross-correlation function.

The device advantageously comprises a first and a second wheel.

The teeth of the first wheel are advantageously disposed alternating with the teeth of the second wheel.

The analog-to-digital converter advantageously operates at a sampling frequency fe.

The computer advantageously calculates the cross-correlation function at a working frequency equal to the sampling frequency fe.

The analog signals from the sensor are advantageously electrical signals.

The sensor is advantageously a variable-reluctance transducer.

The computer is advantageously capable of interpolating the cross-correlation function of two digital signals from the converter, and this preferably by a parabolic interpolation method with least squares.

The invention also relates to a shaft provided with a device according to the invention.

BRIEF DESCRIPTION OF THE FIGURES

Other features and advantages of the invention will emerge from the reading of the following description, making reference to the appended figures, in which:

FIG. 1 illustrates a perspective diagrammatic representation of a shaft provided with a device according to an embodiment of the invention;

FIG. 2 illustrates a cross-sectional diagrammatic representation of the shaft and of the device of FIG. 1;

For greater clarity, identical or similar elements are referred to by identical reference numbers in all the figures.

DETAILED DESCRIPTION OF AN EMBODIMENT

Figure 3:
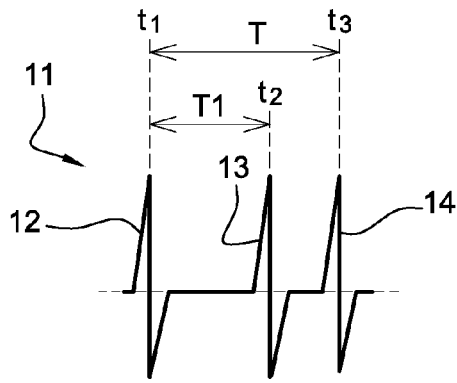
FIG. 3 illustrates a diagrammatic representation of a first analog signal obtained using the device of FIG. 1.

FIGS. 1 and 2 represent a shaft 1 provided with a device 2 according to an embodiment of the invention. Device 2 comprises a first wheel 3 and a second wheel 4. First wheel 3 and second wheel 4 are preferably phonic wheels. First wheel 3 is integral with a first point 6 of shaft 1. Second wheel 4 is integral with a second point 7 of shaft 1. Second wheel 4 is linked to second point 7 by means of a sleeve 8 which does not transmit torque, such that second wheel 4 is situated in the vicinity of first wheel 3, but it is integral with a point 7 which is distance from point 6 with which first wheel 3 is integral.

First and second wheels 3 and 4 are each provided with teeth, respectively 3a, 3b, 3c... and 4a, 4b, 4c.... Each wheel preferably comprises 6 teeth 3a to 3f and 4a to 4f. The teeth of first wheel 3 are disposed such that they alternate with the teeth of second wheel 4. Thus, tooth 3a is located between teeth 4f and 4a, tooth 3b being located between teeth 4a and 4b....

The device according to the invention also comprises a sensor 5 disposed above wheels 3 and 4 in such a way as to be sensitive to the passage of each of the teeth of the two wheels. Sensor 5 emits an analog signal producing a pulse each time a tooth passes in front of it.

Sensor 5 is preferably a variable-reluctance transducer which generates an electrical pulse each time a tooth passes in front of it.

Device 2 also comprises an analog-to-digital converter 9 capable of transforming the analog signal from sensor 5 into a digital signal with a sampling frequency fe. The digital signal is preferably stored on 12 or 16 bits.

Device 2 also comprises a computer 10 which in particular is capable of:

calculating the cross-correlation function of the two digital signals from the converter; and calculating the duration between two pulses of the analog signal on the basis of the cross-correlation function.

A method according to an embodiment of the invention will now be described by reference to FIGS. 3 and 4.

During a first step, sensor 5 produces a first analog signal 11, represented in FIG. 3. In this example, analog signal 11 corresponds to the signal generated by sensor 5 during one sixth of a revolution of the shaft. However, it is possible to envisage recording the analog signal emitted by the sensor during a complete revolution of the shaft without departing from the scope of the invention.

As can be seen in FIG. 3, first analog signal 11 produces a pulse every time a tooth passes in front of the sensor. Thus, a first pulse 12' corresponds to the passage of first tooth 3a of first wheel 3 in front of sensor 5. "First tooth" is understood to mean the first tooth that passes in front of the sensor from the moment when the method according to the invention starts. This "first tooth" is not necessarily the first tooth that passes in front of the sensor in absolute terms. Second pulse 13 corresponds to the passage of first tooth 4a of second wheel 4 in front of sensor 5. Third pulse 14 corresponds to the passage of second tooth 3b of first wheel 3 in front of the sensor.

Since the spacing of the teeth of one and the same wheel is constant, the estimate of the duration between two pulses corresponding to the teeth of one and the same wheel permits the rotational speed of the shaft to be obtained. Thus, the estimate of duration T between pulses 12 and 14 permits the angular speed of shaft 1 to be obtained.

The spacing between the teeth of first wheel 3 and of those of second wheel 4, on the other hand, depends on the torque of the shaft. Consequently, the estimate of duration T1 between pulse 12, which corresponds to the passage of first tooth 3a of the first wheel, and pulse 13, which corresponds to the passage of first tooth 4a of the second wheel, permits the torque of the shaft to be obtained.

The first analog signal is then converted into the first digital signal. The conversion of the first analog signal into a first digital signal is preferably carried out at high frequency, i.e. at a sampling frequency preferably higher than or equal to 100 kHz, preferably equal to 200 kHz. The first digital signal is then recorded.

A second analog signal is then generated. This second analog signal has a duration equal to that of the first analog signal, but it is offset in time. Thus, when the first analog signal corresponds to the signal emitted by the sensor during a complete rotation of the shaft, the second analog signal preferably corresponds to the signal emitted by the sensor during the following rotation of the shaft. In the present case, since the first analog signal corresponds to the signal emitted by the sensor during one sixth of a rotation of the shaft, the second analog signal will also correspond to the signal emitted by the sensor during one sixth of a rotation of the shaft. The sixth of a rotation of the shaft during which the second analog signal takes place can be the sixth of a rotation of the shaft that directly follows the sixth of a rotation of the shaft during which the first analog signal takes place or it can be offset by a rotation or a portion of a rotation with respect to the sixth of a rotation of the shaft during which the first analog signal takes place.

Thus, if the first analog signal is the signal that corresponds to a passage of teeth 3a, 4a and 3b in front of the sensor, the second analog signal will be able to correspond either to the next passage of teeth 3a, 4a and 3b in front of the sensor, or the passage of teeth 4b, 3c, 4c. When the shaft rotates at a constant speed and it transmits a constant torque value, the second analog signal is therefore generally essentially identical to the first analog signal, except for the fact that it is offset in time.

The second analog signal is then converted into a second digital signal. The conversion of the second analog signal into a second digital signal is carried out at the same sampling frequency as the conversion of the first analog signal into a first digital signal. The second digital signal is recorded.

The method according to the invention then comprises a step during which the first digital signal and the second digital signal are cross-correlated digitally, preferably at a sampling frequency equal to the frequency at which the analog signals have been digitised.

Thus, if x(k), for k varying from 1 to n-m, denotes the first digital signal and y(k), for k varying from 1 to n-m, denotes the second digital signal, the temporal cross-correlation function of the first and the second digital signal is given, for each point m, by:

$$I(m) = \sum_{k=1}^{n-m} \frac{(x(k) - x_m) * (y(m + k) - y_m)}{n}$$

With:
n which denotes the total duration of each of the digital signals;
$x_m$ which denotes the mean value of the first digital signal;
$y_m$ which denotes the mean value of the second digital signal.

The cross-correlation function I(m) is thus calculated for each point m belonging to the interval [0, n]. Cross-correlation function I thus obtained is represented in FIG. 4.

Figure 4:
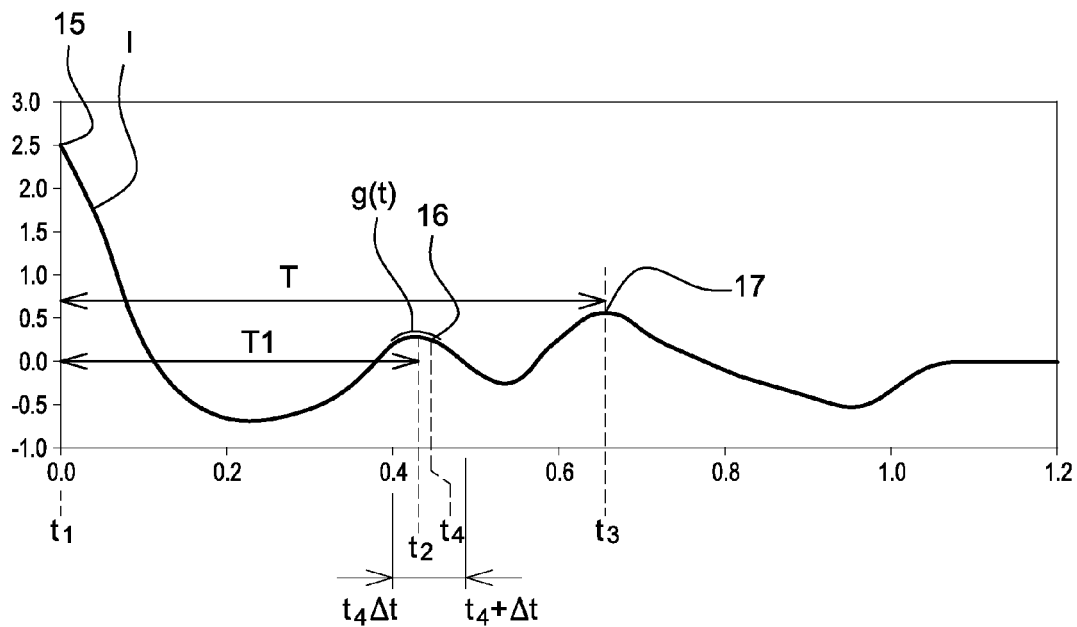
FIG. 4 illustrates a diagrammatic representation of an cross-correlation function obtained using the device of FIG. 1.

As can be seen in FIG. 4, cross-correlation function I has a maximum 15, 16, 17 each time the first analog signal produces a pulse, respectively 12, 13 and 14.

Up to now, the method according to the invention is identical, whether it is used to calculate to the rotational speed of the shaft or to calculate its torque. Depending on whether the method according to the invention is used to calculate the torque or to calculate the angular speed, only the step for calculating the duration between two pulses then differs, and more precisely, only the pulses between which the duration is calculated change.

Thus, when the method according to the invention is used to obtain the torque of the shaft, the duration between two successive pulses is calculated, i.e. duration T1 between pulses 12 and 13 is calculated.

In contrast, if the method according to the invention is used to obtain the angular speed of the shaft, duration T between pulses 12 and 14 is calculated, which are the two pulses corresponding to two successive teeth belonging to one and the same wheel.

The step for calculating the duration between two pulses will now be described in detail in the case where duration T1 between the two pulses 12 and 13 is calculated in order to obtain the torque of the shaft. However, the same calculation steps can be used to calculate the duration between pulses 12 and 14 when it is desired to obtain the angular speed of the shaft.

Thus, to calculate duration T1 between pulses 12 and 13, the method according to the invention comprises a step for calculating duration T1 between maxima 15 and 16 of the cross-correlation function.

According to a preferred embodiment of the invention, time t1=0 corresponds over I(t) to the first pulse, i.e. the passage of the first tooth of the first wheel in front of the sensor. Consequently, to obtain time T1, it suffices to obtain time t2 at which the cross-correlation function reaches maximum 16, which corresponds to pulse 13, which itself corresponds to the passage of the first tooth of the second wheel in front of the sensor.

To obtain time t2, it is known that the first tooth of the second wheel passes in front of the sensor after a time t4 of the order of $1/12^{th}$ of a rotation of the shaft (each wheel in fact comprises six teeth and the teeth of the first and of the second wheel are intercalated). One is therefore positioned in a time interval [t4−Δt, t4+Δt] situated around t4, in which one is sure to find maximum 16 of the cross-correlation function.

Cross-correlation function I is then interpolated, preferably by parabolic interpolation with smallest squares, over this interval [t4−Δt, t4+Δt]. For example, the function of the form $g(t)=a*t^2+b*t+c$ is sought, which moreover approaches cross-correlation function I over this interval. Function g(t) thus obtained is represented in FIG. 4. Point t is then sought for which function g(t) reaches its maximum.

In the present case, function g(t) reaches its maximum for t=t2. Duration T1 between two pulses 12 and 13 is then given by:

$$T1 = t2 - t1 = t2 - 0.$$

The method according to the invention thus makes it possible to obtain very precisely duration T1 and therefore the torque of the shaft, thereby automatically reducing the non-gaussian phase noises of the signals, and it does so without using an additional filter.

This precise determination of the torque then permits the power transmitted by the shaft to be obtained.

Figure 5:
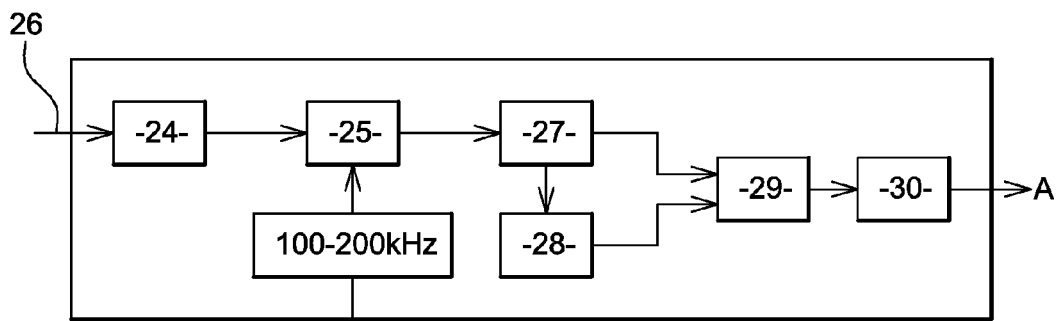
FIG. 5 illustrates a diagrammatic representation of a computing unit used by a device according to an embodiment of the invention.

FIG. 5 represents a computing unit implementing the method according to the invention. This computing unit permits the power of a system transmitted by the shaft to be calculated.

For this, the computing unit preferably comprises a first low-pass filter 24 permitting the analog signals 26 entering it to be filtered. Filter 24 advantageously also permits the signals to be amplified. The computing unit also comprises an analog-to-digital converter 25 for converting the filtered signal into a digital signal at a sampling frequency fe.

The computing unit also comprises a memory 27 and 28 permitting the digital signals to be stored over a rotation or over $1/6^{th}$ of a rotation during two consecutive rotations or two portions of consecutive rotations.

The computing unit also comprises a processor 29 permitting the digital signals to be cross-correlated, as well as a second processor 30 permitting the cross-correlation function obtained by processor 29 to be interpolated.

The invention is of course not limited to the embodiments detailed here and it is in particular possible to envisage using other methods of interpolation of the cross-correlation function. It is also possible to envisage using other sampling frequencies during the analog/digital conversion.

Moreover, teeth 3a, 3b and 4a are used merely by way of example, and any other tooth could be used. Moreover, it is also possible to envisage calculating duration T (or T1) with the aid of two teeth 3a and 4a (or 3a and 3b), then calculating it with the aid of teeth 3b and 4b (or 3b and 3c) and taking the average of the values thus obtained.

The invention claimed is:

1. A method for determining a torque and/or a rotational speed of a rotating shaft, with
   one or more wheels provided with teeth, each wheel being integral with a point of the shaft,
   a sensor configured to generate a pulse of an analog signal each time a tooth passes in front of the sensor;
the method comprising:
   generating a first and a second analog signal with the sensor, the second analog signal being offset in time with respect to the first analog signal, the second analog signal having a duration equal to a duration of the first analog signal;
   converting the first and the second analog signal into a first and a second digital signal;
   calculating a temporal cross-correlation function of the first digital signal with the second digital signal; and
   calculating a duration between two pulses of the first analog signal with the cross-correlation function, wherein calculating the duration between two pulses comprises identifying a maxima of the cross-correlation function;
   calculating times t1 and t2 at which the cross-correlation function reaches the maxima by interpolation of the cross-correlation function, the interpolation of the cross-correlation function being carried out only over time intervals in which times t1 and t2 are expected; and
   calculating a duration between the times t1 and t2.

2. The method according to claim 1, wherein a first wheel and a second wheel are used, the first wheel being integral with a first point of the shaft and the second wheel being integral with a second point of the shaft, the first point being distant from the second point, the first and the second wheel being disposed in such a way that the teeth of the first wheel are alternated with the teeth of the second wheel.

3. The method according to claim 1, wherein the interpolation of the cross-correlation function is carried out by a parabolic interpolation method with least squares.

4. The method according to claim 1, wherein the first analog signal and the second analog signal each have a duration equal to
   the duration of a complete rotation of the shaft or
   the duration of a sixth of a rotation of the shaft.

5. The method according to claim 1, wherein the first analog signal and the second analog signal each correspond to the signal generated by the sensor during two rotations or portions of a rotation of the shaft which are consecutive.

6. A device for implementing the method according to claim 1, the device comprising:
   one or more wheels provided with teeth, each wheel being integral with a point of the shaft,
   a sensor configured to transform a passage of each tooth into pulses of an analog signal;
   an analog-to-digital converter configured to transform the analog signal from the sensor into a digital signal; and
   a computer configured to:
      calculate the cross-correlation function of two digital signals from the analog-to-digital converter; and
      calculate the duration between two pulses of the analog signal on the basis of the cross-correlation function.

7. The device according to claim 6, comprising a first wheel and a second wheel, the teeth of the first wheel being disposed alternated with the teeth of the second wheel.

8. An apparatus comprising a shaft and a device, the device including
   one or more wheels provided with teeth, each wheel being integral with a point of the shaft,
   a sensor configured to transform a passage of each tooth into pulses of an analog signal;
   an analog-to-digital converter configured to transform the analog signal from the sensor into a digital signal; and
   a computer configured to:
      calculate a cross-correlation function of two digital signals from the analog-to-digital converter; and
      calculate a duration between two pulses of the analog signal on the basis of the cross-correlation function, wherein calculating the duration between two pulses comprises identifying a maxima of the cross-correlation function; calculating times t1 and t2 at which the cross-correlation function reaches the maxima by interpolation of the cross-correlation function, the interpolation of the cross-correlation function being carried out only over time intervals in which times t1 and t2 are expected; and calculating a duration between the times t1 and t2.

* * * * *